United States Patent
Abad et al.

(10) Patent No.: US 8,563,098 B2
(45) Date of Patent: Oct. 22, 2013

(54) PNEUMATIC OBJECT PROVIDED WITH A GASTIGHT LAYER CONTAINING A THERMOPLASTIC ELASTOMER AND A PLATY FILLER

(75) Inventors: Vincent Abad, Chamalieres (FR); Emmanuel Custodero, Chamalieres (FR); Vincent Lemal, Loubeyrat (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/387,158

(22) PCT Filed: Jul. 22, 2010

(86) PCT No.: PCT/EP2010/060632
§ 371 (c)(1),
(2), (4) Date: Mar. 2, 2012

(87) PCT Pub. No.: WO2011/012529
PCT Pub. Date: Feb. 3, 2011

(65) Prior Publication Data
US 2012/0156400 A1    Jun. 21, 2012

(30) Foreign Application Priority Data

Jul. 27, 2009 (FR) .................................... 09 55227

(51) Int. Cl.
*A45B 19/00* (2006.01)
*B60C 5/02* (2006.01)
*B60C 5/12* (2006.01)
*C08F 12/02* (2006.01)
*C08F 10/00* (2006.01)

(52) U.S. Cl.
USPC .......... 428/12; 152/510; 152/511; 526/348.7; 526/346

(58) Field of Classification Search
USPC ........... 428/12; 152/510, 511; 526/348.7, 346
See application file for complete search history.

(56) References Cited

U.S. PATENT DOCUMENTS

| 1,930,182 A | 10/1933 | Richardson | 152/12 |
| 2,953,184 A | 9/1960 | Erstad | 152/363 |

(Continued)

FOREIGN PATENT DOCUMENTS

| CA | 2 205 991 | 12/1998 |
| EP | 0 243 851 | 4/1987 |

(Continued)

OTHER PUBLICATIONS

J.E. Puskas et al., "Novel Thermoplastic Elastomers Based on Arborescent (Dendritic) Polyisobutylene with Short Copolymer End Sequences," Journal of Polymer Science, Part A: Polymer Chemistry, vol. 47, No. 4, pp. 1148-1158 (2009).

(Continued)

*Primary Examiner* — William Cheung
(74) *Attorney, Agent, or Firm* — Fitzpatrick, Cella, Harper & Scinto

(57) ABSTRACT

An inflatable article is provided with a layer impermeable to inflation gases. The layer has an elastomer composition that includes at least, as a predominant elastomer by weight, a thermoplastic styrene (TPS) elastomer and a platy filler. The platy filler has an equivalent diameter (Dv (0.5)) of between 20 and 45 micrometers, and has a shape factor (F) greater than 65.

18 Claims, 1 Drawing Sheet

(56) References Cited

U.S. PATENT DOCUMENTS

| | | | |
|---|---|---|---|
| 4,418,093 A | 11/1983 | Gomberg et al. | 427/8 |
| 4,895,692 A | 1/1990 | Laurent et al. | 264/326 |
| 4,910,085 A | 3/1990 | Raniere et al. | 428/412 |
| 4,913,209 A | 4/1990 | Hong et al. | 152/504 |
| 4,946,899 A | 8/1990 | Kennedy | 525/244 |
| 4,952,259 A | 8/1990 | Debroche et al. | 156/117 |
| 5,085,942 A | 2/1992 | Hong et al. | 428/492 |
| 5,260,383 A | 11/1993 | Osman | 525/232 |
| 5,295,525 A | 3/1994 | Sanda, Jr. | 152/503 |
| 6,420,488 B1 | 7/2002 | Penot | 525/332.7 |
| 6,610,261 B1 | 8/2003 | Custodero et al. | 423/127 |
| 6,975,396 B2 | 12/2005 | Custodero et al. | 356/336 |
| 7,425,313 B2 | 9/2008 | Custodero et al. | 423/127 |
| 7,959,849 B2 | 6/2011 | Lopez et al. | 264/501 |
| 2004/0103967 A1 | 6/2004 | Majumdar et al. | 152/450 |
| 2004/0127617 A1 | 7/2004 | Vasseur et al. | 524/318 |
| 2007/0051453 A1 | 3/2007 | Majumdar et al. | 156/123 |
| 2008/0295942 A1 | 12/2008 | Lacour et al. | 152/520 |
| 2009/0084482 A1 | 4/2009 | Majumdar et al. | 152/504 |
| 2009/0160078 A1 | 6/2009 | Abad et al. | 264/178 R |
| 2010/0032070 A1 | 2/2010 | Albert et al. | 152/504 |
| 2010/0051158 A1 | 3/2010 | Albert et al. | 152/503 |
| 2010/0263778 A1* | 10/2010 | Lesage et al. | 152/511 |
| 2010/0300593 A1 | 12/2010 | Merino Lopez et al. | 152/504 |
| 2011/0017377 A1 | 1/2011 | Albert et al. | 152/520 |
| 2011/0061782 A1 | 3/2011 | Merino Lopez et al. | 152/503 |
| 2011/0108186 A1 | 5/2011 | Abad et al. | 156/114 |

FOREIGN PATENT DOCUMENTS

| | | |
|---|---|---|
| EP | 0 264 600 | 4/1988 |
| EP | 0 248 301 | 6/1989 |
| EP | 0 731 112 | 9/1996 |
| EP | 1 762 373 | 3/2007 |
| EP | 1 816 086 | 8/2007 |
| EP | 2 042 296 | 4/2009 |
| FR | 2 910 382 | 6/2008 |
| FR | 2 910 478 | 6/2008 |
| FR | 2 918 669 | 1/2009 |
| FR | 2918669 A1 * | 1/2009 |
| FR | 2 925 388 | 6/2009 |
| JP | 2009-13259 | 1/2009 |
| WO | WO 00/05300 | 2/2000 |
| WO | WO 02/088238 | 11/2002 |
| WO | WO 2004/002760 | 1/2004 |
| WO | WO 2009/007064 | 1/2009 |

OTHER PUBLICATIONS

G. Kaszas et al., "New Thermoplastic Elastomers of Rubbery Polyisobutylene and Glassy Cyclopolyisoprene Segments," Journal of Applied Polymer Science, vol. 39, pp. 119-144 (1990).

J.E. Puskas et al., "New Transparent Flexible UV-Cured Films from Polyisobutylene-Polyisoprene block Polymers," Journal of Macromolecular Science—Chemistry, vol. A28, No. 1, pp. 65-80 (1991).

J.P. Kennedy et al., "Polyisobutylene-Containing Block Polymers by Sequential Monomer Addition. 8. Synthesis, Characterization, and Physical Properties of Poly(indene-b-isobutylene-b-indene) Thermoplastic Elastomers", Macromolecules, vol. 26, No. 3, pp. 429-435 (1993).

J.P. Kennedy et al., "Polyisobutylene-Containing Block Copolymers by Sequential Monomer Addition. 5. Synthesis, Characterization, and Select Properties of Poly(p-tert-butylstyrene-b-isobutylene-b-p-tert-butylstyrene)," Macromolecules, vol. 24, No. 25, pp. 6572-6577 (1991).

D. Feng et al., "Facile synthesis of diphenylethylene end-functional polyisobutylene and its applications for the synthesis of block copolymers containing poly(methacrylate)s," Polymer, vol. 49, pp. 386-393 (2008).

J.P. Kennedy et al., "Poly(methyl methacrylate)-block-polyisobutylene-block-poly(methyl methacrylate) Thermoplastic Elastomers," Catalysis in Polymer Synthesis, edited by E. Vandenberg et al., American Chemical Society Symposium Series, Washington, D.C., Chapter 20 (1992).

J.E. Puskas, et al., "Multiarm-Star Polyisobutylenes by Living Carbocationic Polymerization," Journal of Polymer Science: Part A: Polymer Chemistry, vol. 36, pp. 85-92 (1998).

J.E. Puskas, et al., "Synthesis and Characterization of Novel Dendritic (Arborscent, Hyperbranched) Polyisobutylene—Polystyrene Block Copolymers," Journal of Polymer Science: Part A: Polymer Chemistry, vol. 43, pp. 1811-1826 (2005).

G. Kaszas, et al., "Polyisobutylene-Containing Block Polymers by Sequential Monomer Addition. I. The Living Carbocationic Polymerization of Styrene," Journal of Polymer Science: Part A: Polymer Chemistry, vol. 29, pp. 421-426 (1991).

R. Mildenberg, et al., "Hydrocarbon Resins", New York, VCH (John Wiley Co.), 1997, Chapter 5.5: "Rubber Tires and Mechanical Rubber Goods," pp. 141-146.

\* cited by examiner

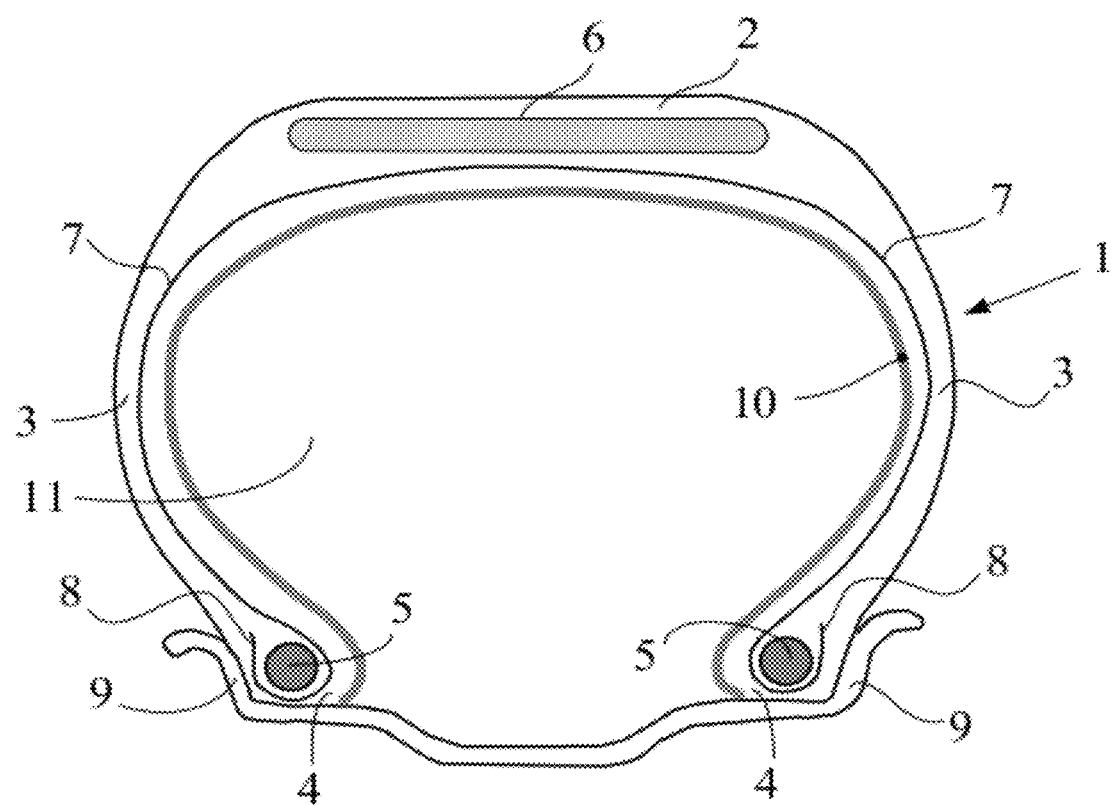

PNEUMATIC OBJECT PROVIDED WITH A GASTIGHT LAYER CONTAINING A THERMOPLASTIC ELASTOMER AND A PLATY FILLER

The present application is a national-stage entry under 35 U.S.C. §371 of International Application No. PCT/EP2010/060632 filed on Jul. 22, 2010, and claims the benefit of foreign priority under 35 U.S.C. §119(a)-(d) of French Application No. 0955227 filed on Jul. 27, 2009.

FIELD OF THE INVENTION

The present invention relates to "inflatable" articles, that is to say, by definition, to articles that assume their useable shape when they are inflated with air or with an equivalent inflation gas.

It relates more particularly to the gastight layers that ensure the impermeability of these inflatable articles, in particular that of pneumatic tires.

BACKGROUND

In a conventional pneumatic tire of the "tubeless" type (that is to say of the type without an inner tube), the radially internal face comprises an airtight layer (or more generally a layer that is impermeable to any inflation gas) which enables the pneumatic tire to be inflated and kept under pressure. Its sealing properties enable it to guarantee a relatively low rate of pressure loss, making it possible to keep the tire inflated, in the normal operating state, for a sufficient time, normally several weeks or several months. It also has the role of protecting the carcass reinforcement and more generally the rest of the tire from a risk of oxidation due to the diffusion of air coming from the internal space of the tire.

This role of airtight inner layer or "inner liner" is today fulfilled by compositions based on butyl rubber (isobutylene/isoprene copolymer), long renowned for their excellent sealing properties.

However, one well-known drawback of compositions based on butyl rubber or elastomer is that they have high hysteresis losses, furthermore over a wide temperature range, which drawback degrades the rolling resistance of pneumatic tires.

Reducing the hysteresis of these sealing inner layers and therefore, in fine, the fuel consumption of motor vehicles, is a general objective which current technology comes up against.

Document WO 2009/007064 by the Applicant companies discloses an inflatable article provided with a layer impermeable to inflation gases, in which the airtight layer has an elastomer composition comprising at least one thermoplastic styrene (TPS) elastomer and a platy filler, in which the volume content of the platy filler relative to the elastomer composition is greater than 5% (% by volume of the elastomer composition). Compared with a butyl rubber, the thermoplastic styrene elastomer has the major advantage, due to its thermoplastic nature, of being able to be worked as is in the molten (liquid) state, and consequently of offering a possibility of simplified processing; it has also proved compatible with the use of a platy filler in particularly high amounts, which makes it possible to improve the sealing compared with the solutions known from the prior art based on butyl rubber.

In the continuance of their research, the Applicant companies have discovered that a judicious choice of platy fillers also makes it possible to improve the sealing properties of the airtight layers based on a thermoplastic styrene (TPS) elastomer.

According to a first subject, the present invention relates to a similar inflatable article in which the elastomer composition comprises a platy filler having an equivalent diameter ($D_V(0.5)$) of between 20 and 45 micrometers and a shape factor (F) greater than 65 with:

$$F = \frac{S_{BET}}{S_{sphere}} = \frac{\rho S_{BET} D_V(0.5)}{6},$$

in which:
$S_{BET}$ is the specific surface area of the platy filler measured by the BET method, in $m^2/g$;
$S_{sphere}$ is the specific surface area, in $m^2/g$, of a sphere of identical equivalent diameter $D_V(0.5)$;
$Dv(0.5)$ is the equivalent diameter in µm; and
$\rho$ is the density of the platy filler in $g/cm^3$.

The invention particularly relates to inflatable articles made of rubber such as pneumatic tires, or inner tubes, especially inner tubes for a pneumatic tire.

The invention relates more particularly to the pneumatic tires intended to be fitted on motor vehicles of the passenger type, SUVs (Sport Utility Vehicles), two-wheel vehicles (especially motorcycles and bicycles), aircraft, or industrial vehicles chosen from vans, "heavy" vehicles, i.e. underground trains, buses, heavy road transport vehicles (lorries, tractors, trailers), off-road vehicles, such as agricultural or civil engineering machines, and other transport or handling vehicles.

The invention and its advantages will be readily understood in light of the description and the exemplary embodiments that follow, and also from the single FIGURE relating to these examples which schematically shows, in radial cross section, a pneumatic tire in accordance with one subject of the invention.

I. DETAILED DESCRIPTION OF THE INVENTION

In the present description, unless otherwise indicated, all the percentages (%) indicated are % by weight.

Moreover, any range of values denoted by the expression "between a and b" represents the field of values ranging from more than a to less than b (that is to say limits a and b excluded) whereas any range of values denoted by the expression "from a to b" means the field of values ranging from a up to b (that is say including the strict limits a and b).

I-1. Gastight Elastomer Composition

The inflatable article according to the invention has the main feature of being provided with a layer that is impermeable to inflation gases that comprises an elastomer composition comprising at least one thermoplastic TPS elastomer, combined with which is a platy filler having an equivalent diameter $D_V(0.5)$ of between 20 and 45 micrometers (µm), and a shape factor F greater than 65, and optionally an extender oil for the elastomer.

I-1-A. Thermoplastic Elastomer

Thermoplastic elastomers (abbreviated to TPEs) have a structure intermediate between thermoplastic polymers and elastomers. They are composed of hard thermoplastic blocks linked by soft elastomer blocks, for example polybutadiene, polyisoprene, poly(ethylene-butylene) or else polyisobutylene blocks. They are often triblock elastomers with two hard segments linked by a soft segment. The hard and soft segments may be in a linear, star or branched configuration. Typically, each of these segments or blocks contains at least more than 5, generally more than 10 base units (for example styrene units and isoprene units for a styrene/isoprene/styrene block copolymer).

The TPS elastomer according to one subject of the invention is characterized in that it is chosen from thermoplastic styrene elastomers. In the present description, the expression "styrene monomer" should be understood as meaning any unsubstituted or substituted styrene-based monomer; among the substituted styrenes that may be mentioned, for example, are methylstyrenes (for example o-methylstyrene, m-methylstyrene or p-methylstyrene, α-methylstyrene, α-2-dimethylstyrene, α-4-dimethylstyrene or diphenylethylene), para-tert-butylstyrene, chlorostyrenes (for example o-chlorostyrene, m-chlorostyrene, p-chlorostyrene, 2,4-dichlorostyrene, 2,6-dichlorostyrene or 2,4,6-trichlorostyrene), bromostyrenes (for example o-bromostyrene, m-bromostyrene, p-bromostyrene, 2,4-dibromostyrene, 2,6-dibromostyrene or 2,4,6-tribromostyrene), fluorostyrenes (for example o-fluorostyrene, m-fluorostyrene, p-fluorostyrene, 2,4-difluorostyrene, 2,6-difluorostyrene or 2,4,6-trifluorostyrene) or else para-hydroxystyrene.

The thermoplastic styrene elastomer comprises a butyl-based elastomer.

Preferably, the thermoplastic TPS elastomer is a copolymer containing polystyrene and polyisobutylene blocks. Such a definition should be understood as meaning any thermoplastic copolymer comprising at least one polystyrene block (that is to say one or more polystyrene blocks) and at least one polyisobutylene block (that is to say one or more polyisobutylene blocks), with which other blocks (for example polyethylene and/or polypropylene blocks) and/or other monomer units (for example unsaturated units such as diene units) may or may not be combined.

More preferably still, such a block copolymer is a styrene/isobutylene/styrene (SIBS) triblock copolymer. The expression "SIBS elastomer or copolymer" is understood in the present application to mean, by definition, any styrene/isobutylene/styrene triblock elastomer in which the central polyisobutylene block may or may not be interrupted by one or more unsaturated units, in particular one or more diene units such as isoprene units, which are optionally halogenated.

According to one preferred embodiment of the invention, the weight content of styrene in the styrene elastomer is between 5% and 50%. Below the minimum indicated, the thermoplastic nature of the elastomer runs the risk of being substantially reduced, whereas above the recommended maximum the elasticity of the airtight layer may be adversely affected. For these reasons, the styrene content is more preferably between 10% and 40%, in particular between 15 and 35%.

It is preferable for the glass transition temperature ($T_g$, measured according to ASTM D3418) of the TPS elastomer to be below −20° C., more preferably below −40° C. A $T_g$ value above these low temperatures may reduce the performance of the airtight layer when used at a very low temperature; for such a use, the $T_g$ of the TPS elastomer is more preferably still below −50° C.

The number-average molecular weight (denoted by $M_n$) of the TPS elastomer is preferably between 30 000 and 500 000 g/mol, more preferably between 40 000 and 400 000 g/mol. Below the minimum values indicated, the cohesion between the elastomer chains, especially due to the optional dilution of the latter via an extender oil, runs the risk of being adversely affected; moreover, an increase in the usage temperature runs the risk of adversely affecting the mechanical properties, especially the properties at break, consequently leading to reduced "hot" performance. Moreover, too high a weight may be detrimental as regards the flexibility of the gastight layer. Thus, it has been observed that a value lying within a range of 50 000 to 300 000 g/mol was particularly suitable, especially for use of the composition in a pneumatic tire.

The number-average molecular weight ($M_n$) of the TPS elastomer is determined in a known manner by size exclusion chromatography (SEC). The specimen is first dissolved in tetrahydrofuran at a concentration of about 1 g/l; then the solution is filtered on a filter of 0.45 μm porosity before injection. The apparatus used is a WATERS Alliance chromatograph. The elution solvent is tetrahydrofuran, the flow rate is 0.7 ml/min, the temperature of the system is 35° C. and the analysis time is 90 min. A set of four WATERS columns in series having the trade names STYRAGEL (HMW7, HMW6E and two HT6E) is used. The injected volume of the polymer specimen solution is 100 μl. The detector is a WATERS 2410 differential refractometer and its associated software for handling the chromatographic data is the WATERS MILLENNIUM system. The calculated average molecular weights are relative to a calibration curve obtained with polystyrene standards.

The polydispersity index $I_p$ (N.B: $I_p=M_w/M_n$ where $M_w$ is the weight-average molecular weight) of the TPS elastomer is preferably less than 3; more preferably $I_p$ is less than 2.

The TPS elastomer and the platy filler may, on their own, constitute the gastight elastomer layer or else be combined, in the elastomer composition, with other elastomers.

If optional other elastomers are used in the composition, the TPS elastomer constitutes the predominant elastomer by weight; it then preferably represents more than 50%, more preferably more than 70% by weight of all of the elastomers present in the elastomer composition. Such additional elastomers, which are the minority by weight, could be for example diene elastomers such as natural rubber or a synthetic polyisoprene, a butyl rubber or thermoplastic elastomers other than thermoplastic styrene elastomers, within the limit of the compatibility of their microstructures.

However, according to one particular embodiment, the TPS, in particular SIBS, elastomer is the sole elastomer, and the sole thermoplastic elastomer present in the elastomer composition of the gastight layer.

The TPS elastomers may be processed in a conventional manner, by extrusion or molding, for example starting from a raw material available in the form of beads or granules.

The TPS elastomers are available commercially, sold for example as regards the SIBS by KANEKA under the name "SIBSTAR" (e.g. "Sibstar 102T", "Sibstar 103T" or "Sibstar 073T"). They have for example been described, and also their synthesis, in patent documents EP 731 112, U.S. Pat. No. 4,946,899 and U.S. Pat. No. 5,260,383. They were firstly developed for biomedical applications then described in various applications specific to TPS elastomers, as varied as medical equipment, motor vehicle parts or parts for electrical goods, sheaths for electrical wires, sealing or elastic parts (see, for example, EP 1 431 343, EP 1 561 783, EP 1 566 405 and WO 2005/103146).

I-1-B. Platy Filler

The use of a platy filler advantageously makes it possible to reduce the permeability coefficient (therefore to increase the sealing) of the elastomer composition without excessively increasing its modulus, which makes it possible to retain the ease of integrating the airtight layer into the inflatable article.

Fillers referred to as platy fillers are well known to a person skilled in the art. They have been used, in particular, in pneumatic tires for reducing the permeability of conventional gastight layers based on butyl rubber.

They are generally in the form of stacked lamellae, sheets, platelets or plates with a relatively pronounced anisometry.

The dimensions of these fillers were measured using a laser particle size analyzer. A laser particle size analyzer gives access to a measurable quantity known as the equivalent diameter, $D_V(0.5)$, which is the diameter below which 50% of the total population is present.

The $D_V(0.5)$ measurements were carried out on a Mastersizer S laser particle size analyzer (Malvern Instruments; 3$$D presentation, Fraunhofer model). The results given are expressed in micrometers or µm and correspond to an average of three measurements.

The principle of the machine is the following: a laser beam passes through a cell in which the particles to be analyzed are circulated. The objects illuminated by the laser deflect the light from its main axis. The amount of light deflected and the size of the angle of deflection make it possible to accurately measure the size of the particles.

The test portion is adjusted as a function of the obscuration obtained: in order for the measurement to be good, the amount of light deflected/absorbed by the sample relative to the incident ray should be between 15% and 35%. This is the scenario for all the measurements carried out. The test portion varies depending on the samples (from 10 to 80 mg). The platy fillers were studied in suspension in water or ethanol depending on their nature. A person skilled in the art may adjust the conditions for creating the suspension so as to ensure the stability thereof, especially by using ultrasonic waves to disperse the filler in the medium.

The result is in the form of a curve of the volume distribution as a function of particle size. The equivalent diameter $D_V(0.5)$ corresponds to the diameter below which 50% of the total population is present.

The specific surface area of the platy fillers was also measured by nitrogen adsorption, BET method.

The BET method consists in determining the specific surface area from the amount of nitrogen adsorbed at equilibrium in the form of a monomolecular layer at the surface of the material analyzed.

Physical adsorption is an equilibrium state which depends on the temperature: the condensation of gas molecules on the surface of the solid is favored by a lowering of the temperature (liquid nitrogen). The phenomenon is described by an adsorption isotherm representing the amount of gas adsorbed (nitrogen) on the solid as a function of pressure.

The measurement is carried out on a test portion of between 0.5 and 1.0 g (weighed to within 0.0001 g), so as to fill the sample tube to ¾ of its capacity.

The sample is degassed for 1 hour at 300° C. (this time is counted starting from the moment when the vacuum is reached in the sample tube, namely around 20 mmHg).

After degassing, the sample tube is weighed to within 0.0001 g, so as to know the test portion of the dry sample. The sample tube is positioned on the BET machine. An adsorption isotherm is produced from 7 relative $P/P_0$ pressures, between 0.05 and 0.3 mm $P/P_0$. The software of the measurement machine calculates the BET transform and determines the BET surface area of the sample. The measurement result is expressed to within 0.1 m²/g. $P/P_0$: pressure of nitrogen in the sample tube/saturation vapor pressure of nitrogen at the measurement temperature.

The shape factor (F) of a platy filler is defined by the ratio of the actual specific surface area $S_{BET}$, measured by the BET nitrogen adsorption method and expressed in m²/g, to the specific surface area of a sphere, having the same density and an identical equivalent diameter $D_V(0.5)$, $S_{sphere}$:

$$F = \frac{S_{BET}}{S_{sphere}} = \frac{\rho S_{BET} D_V(0.5)}{6}$$

Preferably, the platy fillers used in accordance with the invention are chosen from the group composed of graphites, phyllosilicates and mixtures of such fillers. Among the phyllosilicates, mention will especially be made of clays, talcs, micas, kaolins, these phyllosilicates possibly being unmodified or modified, for example by a surface treatment.

Use is preferably made of platy fillers such as micas.

As examples of micas corresponding to one subject of the invention, mention may be made of the micas sold by CMMP (Mica-Soft15®), those sold by Yamaguchi (A51S, A41S, SYA-21R, SYA-21RS, SYA-41R). The density ρ of these fillers is 2.85 g/cm³.

The platy fillers described above are used at variable contents, of between 2 and 30%, by volume of elastomer composition, and preferably between 3 and 20% by volume.

The platy fillers having an equivalent diameter $D_V(0.5)$ of between 20 and 45 µm and having a shape factor F greater than 65 make it possible to further improve the impermeability performance of the airtight layers.

The platy fillers may be introduced into the thermoplastic elastomer composition according to various known processes, for example by compounding in solution, by bulk compounding in an internal mixer, or else by compounding via extrusion. It is particularly important to note that when the platy fillers are introduced into a TPS elastomer in the liquid state, the shear forces in the composition are very reduced and modify only very slightly the size distributions and the initial shape factor of the platy fillers.

I-1-C. Extender Oil

The TPS elastomer and the platy filler are sufficient by themselves for the function of impermeability to gases, with respect to the inflatable articles in which they are used, to be fulfilled.

However, according to one preferred embodiment of the invention, the elastomer composition described previously also comprises, as a plasticizing agent, an extender oil (or plasticizing oil), the role of which is to facilitate the processing of the gastight layer, particularly its integration into the inflatable article via a lowering of the modulus and an increase in the tackifying power.

Any extender oil may be used, preferably one having a weakly polar character, capable of extending or plasticizing elastomers, especially thermoplastic elastomers. At ambient temperature (23° C.), these oils, which are relatively viscous, are liquids (i.e. as a reminder, substances having the capability of eventually taking the form of their container), as opposed especially to resins or rubbers, which are by nature solids.

Preferably, the extender oil is chosen from the group formed by polyolefin oils (i.e. those resulting from the polymerization of olefins, monoolefins or diolefins), paraffinic oils, naphthenic oils (of low or high viscosity), aromatic oils, mineral oils and mixtures of these oils.

Although it has been observed that the addition of oil was indeed carried out at the expense of a certain loss of impermeability, which varies depending on the type and amount of oil used, this loss of impermeability may be largely corrected by adjusting the platy filler content.

Preferably, a polybutene oil, in particular a polyisobutylene (PIB) oil, is used, which demonstrated the best compromise of properties compared with the other oils tested, especially compared with a conventional oil of paraffinic type.

As examples, polyisobutylene oils are sold in particular by Univar under the name "Dynapak Poly" (e.g. "Dynapak Poly 190"), by INEOS Oligomer under the name "Indopol H1200", by BASF under the names "Glissopal" (e.g. "Glissopal 1000") or "Oppanol" (e.g. "Oppanol B12"); and paraffinic oils are sold for example by Exxon under the name "Telura 618" or by Repsol under the name "Extensol 51".

The number-average molecular weight ($M_n$) of the extender oil is preferably between 200 and 25 000 g/mol, more preferably still between 300 and 10 000 g/mol. For excessively low weights $M_n$, there is a risk of the oil migrating to the outside of the composition and an excessive tack, whereas excessively high weights may result in this composition becoming too stiff. A weight $M_n$ between 350 and 4000 g/mol, in particular between 400 and 3000 g/mol, proves to be an excellent compromise for the intended applications, in particular for use in a pneumatic tire.

The number-average molecular weight ($M_n$) of the extender oil is determined by SEC, according to the procedure described previously.

A person skilled in the art will know, in the light of the description and the embodiments that follow, how to adjust the quantity of extender oil according to the particular usage conditions of the gastight elastomer layer, in particular of the inflatable article in which it is intended to be used.

It is preferable for the extender oil content to be greater than 5 phr, preferably between 5 and 150 phr (parts by weight per hundred parts of total elastomer, that is to say TPS elastomer plus any other possible elastomer present in the elastomer composition or layer).

Below the indicated minimum, the elastomer composition runs the risk of having too high a stiffness for certain applications, whereas above the recommended maximum there is a risk of the composition having insufficient cohesion and of a loss of impermeability which may be damaging depending on the application in question.

For these reasons, in particular for use of the airtight composition in a pneumatic tire, it is preferable for the extender oil content to be greater than 10 phr, especially between 10 and 130 phr, more preferably still for it to be greater than 20 phr, especially between 20 and 100 phr.

I-1-D. Various Additives

The airtight layer or composition described previously may furthermore comprise the various additives usually present in the airtight layers known to a person skilled in the art. Mention will be made, for example, of reinforcing fillers such as carbon black or silica, non-reinforcing or inert fillers other than the platy fillers described previously, colorants that can advantageously be used for coloring the composition, plasticizers other than the aforementioned extender oils, tackifying resins, protective agents such as antioxidants or antiozonants, UV stabilizers, various processing aids or other stabilizers, or else promoters capable of promoting adhesion to the remainder of the structure of the inflatable article.

Besides the elastomers (thermoplastic styrene elastomers and other possible elastomers) described previously, the gastight composition could also comprise, always in a minority weight fraction relative to the TPS elastomer, polymers other than elastomers, such as for example thermoplastic polymers.

The gastight layer or composition described previously is a compound that is solid and elastic (at 23° C.), which is especially characterized, owing to its specific formulation, by a very high flexibility and very high deformability.

I-2. Use of the Airtight Layer in a Pneumatic Tire

The layer or composition based on a TPS elastomer described previously can be used as an airtight layer in any type of inflatable article. As examples of such inflatable articles, mention may be made of inflatable boats, balloons or balls used for games or sports.

It is particularly suitable for use as an airtight layer (or a layer that is impermeable to any other inflation gas, for example nitrogen) in an inflatable article, whether a finished or semi-finished product, made of rubber, most particularly in a pneumatic tire for a motor vehicle such as a two-wheeled, passenger or industrial vehicle. The expression "industrial vehicle" is understood to mean vans, "heavy" vehicles, i.e. underground trains, buses, heavy road transport vehicles (lorries, tractors, trailers), off-road vehicles, such as agricultural or civil engineering machines, and other transport or handling vehicles.

Such an airtight layer is preferably placed on the inner wall of the inflatable article, but it may also be completely integrated into its internal structure.

The thickness of the airtight layer is preferably greater than 0.05 mm, more preferably between 0.1 mm and 10 mm (especially between 0.1 and 1.0 mm).

It will be readily understood that, depending on the specific fields of application and on the dimensions and pressures involved, the method of implementing the invention may vary, the airtight layer then having several preferential thickness ranges.

Thus, for example, in the case of passenger vehicle tires, it may have a thickness of at least 0.05 mm, preferably between 0.1 and 2 mm. According to another example, in the case of heavy or agricultural vehicle tires, the preferred thickness may lie between 1 and 3 mm. According to another example, in the case of tires for vehicles in the civil engineering field or for aircraft, the preferred thickness may lie between 2 and 10 mm.

Compared with a standard airtight layer based on butyl rubber, the airtight layer according to the invention has the advantage of exhibiting not only a lower hysteresis, and therefore of imparting a reduced rolling resistance to the pneumatic tires, but also an impermeability that is at least equal if not largely improved, as is demonstrated in the following exemplary embodiments.

BRIEF DESCRIPTION OF THE DRAWINGS

The sole FIGURE in the drawings schematically shows a radial cross section of a pneumatic tire according to an embodiment of the invention.

II. EXEMPLARY EMBODIMENTS OF THE INVENTION

The gastight layer described previously can advantageously be used in the pneumatic tires of all types of vehicles, in particular passenger vehicles or industrial vehicles such as heavy vehicles.

As an example, the single appended FIGURE shows very schematically (not drawn to scale), a radial cross section of a pneumatic tire according to the invention.

This pneumatic tire 1 has a crown 2 reinforced by a crown reinforcement or belt 6, two sidewalls 3 and two beads 4, each of these beads 4 being reinforced with a bead wire 5. The crown 2 is surmounted by a tread, not shown in this schematic FIGURE. A carcass reinforcement 7 is wound around the two bead wires 5 in each bead 4, the upturn 8 of this reinforcement 7 lying for example towards the outside of the pneumatic tire 1, which here is shown fitted onto its rim 9. The carcass reinforcement 7 consists, as is known per se, of at least one ply reinforced by cords, called "radial" cords, for example textile or metal cords, i.e. these cords are arranged practically parallel to one another and extend from one bead to the other so as to form an angle of between 80° and 90° with the circumferential mid-plane (the plane perpendicular to the axis of rotation of the pneumatic tire, which is located at mid-distance from the two beads 4 and passes through the middle of the crown reinforcement 6).

The inner wall of the pneumatic tire 1 comprises an airtight layer 10, for example having a thickness equal to around 0.9 mm, on the side of the internal cavity 11 of the pneumatic tire 1.

This inner layer (or "inner liner") covers the entire inner wall of the pneumatic tire, extending from one sidewall to the other, at least as far as the rim flange when the pneumatic tire is in the fitted position. It defines the radially internal face of said tire intended to protect the carcass reinforcement from the diffusion of air coming from the internal space 11 of the tire. It enables the pneumatic tire to be inflated and kept under pressure. Its sealing properties ought to enable it to guarantee a relatively low rate of pressure loss, and to make it possible to keep the tire inflated, in the normal operating state, for a sufficient time, normally several weeks or several months.

Unlike a conventional pneumatic tire that uses a composition based on butyl rubber, the pneumatic tire according to the invention uses, in this example, as the airtight layer 10, an elastomer composition comprising a SIBS elastomer ("Sibstar 102T" with a styrene content of around 15%, a $T_g$ of around −65° C. and an $M_n$ of around 90 000 g/mol) extended for example with a PIB oil (for example 40 phr of "Dynapak Poly 190" oil—$M_n$ of around 1000 g/mol), and also a platy filler.

The pneumatic tire provided with its airtight layer (10) as described above may be produced before or after vulcanization (or curing).

In the first case (i.e., before curing of the pneumatic tire), the airtight layer is simply applied in a conventional manner at the desired place, so as to form the layer 10. The vulcanization is then carried out conventionally. The TPS elastomers are well able to withstand the stresses associated with the vulcanization step.

One advantageous manufacturing variant, for a person skilled in the art of pneumatic tires, would consist for example during a first step, in laying down the airtight layer flat directly onto a building drum, in the form of a skim with a suitable thickness, before this skim is covered with the rest of the structure of the pneumatic tire, according to manufacturing techniques well known to a person skilled in the art.

In the second case (i.e. after curing of the pneumatic tire), the airtight layer is applied to the inside of the cured pneumatic tire by any appropriate means, for example by bonding, by spraying or else by extrusion and blow molding of a film of suitable thickness.

II-1. Impermeability Tests

In the following examples, the sealing properties were first analyzed on test specimens of compositions based on butyl rubber on the one hand and on TPS elastomer on the other hand, and with platy fillers of varying natures.

For this analysis, a rigid-wall permeameter was used, placed in an oven (temperature of 60° C. in the present case), equipped with a relative pressure sensor (calibrated in the range of 0 to 6 bar) and connected to a tube equipped with an inflation valve. The permeameter may receive test specimens in disc form (for example having a diameter of 65 mm in the present case) and with a uniform thickness which may range up to 1.5 mm (0.5 mm in the present case). The pressure sensor is connected to a National Instruments data acquisition card (0-10 V analogue four-channel acquisition) which is connected to a computer that carries out a continuous acquisition with a frequency of 0.5 Hz (1 point every two seconds). The permeability coefficient (K) is measured from the linear regression line giving the slope α of the pressure loss through the test specimen tested as a function of the time, after stabilization of the system, that is to say after obtaining a steady state during which the pressure decreases linearly as a function of the time.

A) Test 1

Gastight compositions containing an SIBS elastomer ("Sibstar 102T"), a PIB oil ("Dynapak 190") and various platy fillers of mica type were prepared by twin-screw extrusion at a temperature above the softening point of the TPS elastomer used, thus enabling liquid processing of the material. The platy fillers were introduced into the SIBS elastomer and the PIB oil via extrusion.

The control airtight composition is a conventional composition for an inner liner, based on butyl rubber and on carbon black (with no platy filler). The formulation is presented in Table 1.

TABLE 1

| inner liner formulation (in phr) | |
|---|---|
| Butyl rubber (1) | 100 |
| Carbon black (N772) | 50 |
| Zinc oxide | 1.5 |
| Stearic acid | 1.5 |
| Sulphenamide | 1.2 |
| Sulphur | 1.5 |

(1): brominated polyisobutylene "Bromobutyl 2222" sold by Exxon Chemical Co.

The impermeability was measured on test specimens according to the procedure described above.

Table 2 presents the size and shape factor characteristics of the three mica-type platy fillers used.

TABLE 2

| Platy filler | $D_V(0.5)$ (μm) | BET (m²/g) | F | |
|---|---|---|---|---|
| Mica—A41S[1] | 42 | 3.7 | 73 | C-3 |
| Mica—Mica-MU ® 247[2] | 81 | 2.7 | 104 | C-4 |
| Mica—MS 30-80[3] | 45 | 2.7 | 57 | C-5 |

[1]Supplier: Yamaguchi;
[2]Supplier: CMMP;
[3]Supplier: GEOKOM.

The four formulations of airtight compositions from the first test and also the relative performances thereof, compared to the control based on butyl rubber (composition C-1), are indicated in Table 3 below. The contents of plasticizer are expressed in phr, those of platy filler in phr (relative to the weight of SIBS elastomer) and also in vol % (relative to the total volume of the composition).

TABLE 3

| Composition No.: | | C-1 | C-2 | C-3 | C-4 | C-5 |
|---|---|---|---|---|---|---|
| Butyl-based inner liner | | 100 | — | — | — | — |
| SIBS—Sibstar 102T | | — | 100 | 100 | 100 | 100 |
| PIB oil—Dynapak P 190 | (phr) | — | 66.7 | 66.7 | 66.7 | 66.7 |

TABLE 3-continued

| Composition No.: | | C-1 | C-2 | C-3 | C-4 | C-5 |
|---|---|---|---|---|---|---|
| Mica—A41S[1] | (phr) | — | — | 39.4 | — | — |
| | (% vol) | | | 7.5 | | |
| Mica—Mica-MU ® 247[2] | (phr) | — | — | — | 39.4 | — |
| | (% vol) | | | | 7.5 | |
| Mica—MS 30-80[3] | (phr) | — | — | — | — | 39.4 |
| | (% vol) | | | | | 7.5 |
| Relative impermeability | (%) | 100 | 46 | 95 | 77 | 74 |

The formulation C-2 comprises Sibstar 102T as elastomer and 66.7 phr of PIB extender oil. This formulation has a relative impermeability well below that of the control.

The addition of platy fillers at a content of 39.4 phr substantially improves the impermeability performance of compositions based on Sibstar 102T, up to practically equaling the performance of the control. Large differences are also observed as a function of the type of platy filler used.

Only the composition C-3 uses a filler in accordance with one subject of the invention.

This composition C-3 has a relative impermeability that is practically identical to that of the control C-1. On the other hand, the composition C-4, which comprises a platy filler with a size $D_V(0.5)$ greater than the [20-45] micrometers range, has a relative impermeability that is substantially reduced compared to the control C-1 and compared to that of the composition C-3. The composition C-5 comprises a platy filler with a size $D_V(0.5)$ equal to 45 μm, therefore comparable to that of the filler of composition C-3, on the other hand, its shape factor F is equal to 56, below the threshold value of 65. The relative impermeability of composition C-5 is 74, i.e. much lower than those of the control C-1 and of composition C-3. It is thus seen that the conjunction of the two parameters is necessary in order to determine the preferential characteristics of the platy fillers.

B) Test 2

Other gastight compositions were prepared, containing the SIBS elastomer ("Sibstar 102T"), the PIB oil ("Indopol H1200") and four platy fillers of mica type. The platy fillers were introduced into the SIBS elastomer and the PIB oil by twin-screw extrusion and at a temperature above the softening point of the elastomer.

The control airtight composition is identical to that from test 1.

Table 4 presents the size and shape factor characteristics of the three mica-type platy fillers used.

TABLE 4

| Platy filler | $D_V(0.5)$ (μm) | BET (m²/g) | F | |
|---|---|---|---|---|
| Mica—Iriodin ® 153[1] | 47 | 4.0 | 89 | C-7 |
| Mica—A51S[2] | 44 | 3.4 | 72 | C-8 |
| Mica—SYA-21R[2] | 25 | 8.0 | 94 | C-9 |
| Mica—MS 30-80[3] | 45 | 2.7 | 57 | C-10 |

[1]Supplier: Merck;
[2]Supplier: Yamaguchi;
[3]Supplier: GEOKOM.

The four formulations of airtight compositions from the second test and also the relative performances thereof, compared to the control based on butyl rubber (composition C-1), are indicated in Table 5 below. The contents of plasticizer are expressed in phr, those of platy filler in phr (relative to the weight of SIBS elastomer) and also in vol % (relative to the total volume of the composition).

TABLE 5

| Composition No.: | | C-1 | C-6 | C-7 | C-8 | C-9 | C-10 |
|---|---|---|---|---|---|---|---|
| Butyl rubber | | 100 | — | — | — | — | — |
| SIBS—Sibstar 102T | | — | 100 | 100 | 100 | 100 | — |
| PIB oil—INDOPOL H1200 | (phr) | — | 66.7 | 66.7 | 66.7 | 66.7 | — |
| Mica—Iriodin ® 153 | (phr) | — | — | 39.4 | — | — | — |
| | (% vol) | | | 7.5 | | | |
| Mica—A51S | (phr) | — | — | — | 39.4 | — | — |
| | (% vol) | | | | 7.5 | | |
| Mica—SYA-21R | (phr) | — | — | — | — | 39.4 | — |
| | (% vol) | | | | | 7.5 | |
| Mica—MS 30-80 | (phr) | — | — | — | — | — | 39.4 |
| | (% vol) | | | | | | 7.5 |
| Relative impermeability | (%) | 100 | 77 | 155 | 215 | 204 | 97 |

The relative impermeabilities of the four compositions C-7 to C-10, which all comprise a mica-type platy filler at a volume content of 7.5%, are seen to be substantially improved or identical to that of the control.

This test makes it possible again to demonstrate the importance of the nature of the platy fillers with respect to the impermeability performance.

Compositions C-8 and C-9 each utilize a platy filler in accordance with one subject of the invention. Their impermeability performances are doubled compared to the control.

Composition C-7 utilizes a platy filler having a size that is too large compared to those recommended in the present application. Its impermeability performance is intermediate between those of the control and of the two compositions in accordance with the invention. Composition C-10 utilizes a platy filler having a size that is in accordance with the invention but the shape factor F of which is below the limit chosen. The impermeability performance of this composition is similar to that of the control.

II-2. Pneumatic Tire Tests

Following the above laboratory tests, pneumatic tires, of the passenger vehicle type (dimension 195/65 R15), were manufactured, their inner wall being covered with an airtight layer (10) having a constant given thickness (laid on a building drum, before manufacture of the rest of the tire). The tires were then vulcanized.

The characteristics of the platy fillers used are found in Table 6.

TABLE 6

| Platy filler | $D_V(0.5)$ (μm) | BET (m²/g) | F | |
|---|---|---|---|---|
| Mica—SYA-41R[1] | 39 | 4.6 | 86 | C-11 |
| Mica—Mica-MU ® 280[2] | 98 | 1.8 | 84 | C-12 |

[1]Supplier: Yamaguchi;
[2]Supplier: CMMP.

The formulations of the airtight layers are found in Table 7.

TABLE 7

| Composition No.: | | C-1 | C-11 | C-12 |
|---|---|---|---|---|
| Butyl rubber | | 100 | — | — |
| SIBS—Sibstar 102T | | — | 100 | 100 |
| PIB oil—Dynapak P 190 | (phr) | — | 66.7 | 66.7 |
| Mica—SYA-41R | (phr) | — | 39.4 | |
| | (% vol) | | 7.5 | |

TABLE 7-continued

| Composition No.: | | C-1 | C-11 | C-12 |
|---|---|---|---|---|
| Mica—Mica-MU ® 280 | (phr) | — | — | 39.4 |
| | (% vol) | | | 7.5- |
| Relative impermeability | (%) | 100 | 103 | 65 |
| Pneumatic tire pressure loss | (mbar) | 47.5 | 46 | 73 |

The pneumatic tires according to the invention were compared with a control pneumatic tire (Michelin "Energy 3" brand of the same dimension 195/65 R15) comprising a conventional airtight layer, of the same thickness, based on butyl rubber. The impermeability of the two types of tires was measured (loss of pressure at 20° C. after 4 weeks, initial pressure: 2.5 bar); the results of these pressure losses are in complete agreement with the laboratory results carried out on the airtight compositions (see Table 7).

The rolling resistance of the pneumatic tires was also measured on a flywheel, according to the ISO 87-67 (1992) method. It was observed that the pneumatic tires of the invention had a rolling resistance that was reduced very significantly, and unexpectedly for a person skilled in the art, by almost 4% relative to the control pneumatic tire.

In conclusion, the invention offers the designers of pneumatic tires the opportunity of reducing the hysteresis of the inner sealing layers very substantially, and therefore of reducing the fuel consumption of motor vehicles fitted with such tires, while providing an impermeability that is at least equal to, if not greater than that obtained with a conventional airtight layer made of butyl rubber.

The invention claimed is:

1. An inflatable article comprising a gastight layer impermeable to inflation gases,
wherein the gastight layer is formed of at least an elastomer composition that includes:
a thermoplastic styrene (TPS) elastomer, the thermoplastic styrene (TPS) elastomer being a predominant elastomer by weight; and
a platy filler,
wherein the platy filler has an equivalent diameter ($D_V$ (0.5)) of between 20 and 45 micrometers, and
wherein in that the platy filler has a shape factor (F) greater than 65 with:

$$F = \frac{S_{BET}}{S_{sphere}} = \frac{\rho S_{BET} D_V(0.5)}{6},$$

in which:
$S_{BET}$ is a specific surface area of the platy filler, in m²/g, measured by a BET method,
$S_{sphere}$ is a specific surface area of a sphere having a same density and an identical equivalent diameter ($D_V$ (0.5)), in m²/g, as the platy filler,
$D_V$ (0.5) is an equivalent diameter, in μm, and
ρ is a density of the platy filler, in g/cm³.

2. An inflatable article according to claim 1, wherein the thermoplastic styrene (TPS) elastomer includes a butyl-based elastomer block.

3. An inflatable article according to claim 1, wherein the thermoplastic styrene (TPS) elastomer is a copolymer that includes styrene and isobutylene blocks.

4. An inflatable article according to claim 1, wherein the thermoplastic styrene (TPS) elastomer is a styrene/isobutylene/styrene copolymer.

5. An inflatable article according to claim 1, wherein the elastomer composition further includes an extender oil for the thermoplastic styrene (TPS) elastomer.

6. An inflatable article according to claim 5, wherein the extender oil for the thermoplastic styrene (TPS) elastomer is a polyisobutylene oil.

7. An inflatable article according to claim 1, wherein the platy filler is chosen from a group that includes graphites, phyllosilicates, and mixtures of graphites and phyllosilicates.

8. An inflatable article according to claim 1, wherein the platy filler includes one or more micas.

9. An inflatable article according to claim 1, wherein the platy filler is present at a content between 2 and 30 vol %.

10. An inflatable article according to claim 1, wherein the platy filler is present at a content between 3 and 20 vol %.

11. An inflatable article according to claim 1, wherein the gastight layer has a thickness greater than 0.05 mm.

12. An inflatable article according to claim 1, wherein the gastight layer has a thickness between 0.1 mm and 10 mm.

13. An inflatable article according to claim 1, wherein the gastight layer has a thickness between 0.1 and 1.0 mm.

14. An inflatable article according to claim 1, wherein the gastight layer is positioned on an inner wall of the inflatable article.

15. An inflatable article according to claim 1, wherein the inflatable article is formed of rubber.

16. An inflatable article according to claim 15, wherein the inflatable article is a pneumatic tire.

17. An inflatable article according to claim 1, wherein the inflatable article is an inner tube.

18. An inflatable article according to claim 15, wherein the inner tube is an inner tube for a pneumatic tire.

* * * * *